United States Patent
Chen et al.

(10) Patent No.: US 7,768,575 B2
(45) Date of Patent: Aug. 3, 2010

(54) METHOD AND APPARATUS FOR CAPTURING CONSECUTIVE FRAMES IN DIGITAL VIDEO

(75) Inventors: Yu-Chih Chen, Hsinchu (TW);
Kuo-Tien Su, Hsinchu (TW);
Meng-Nan Tsou, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 1013 days.

(21) Appl. No.: 11/467,166

(22) Filed: Aug. 25, 2006

(65) Prior Publication Data

US 2007/0046830 A1    Mar. 1, 2007

(30) Foreign Application Priority Data

Aug. 31, 2005    (TW) .............................. 94129930 A

(51) Int. Cl.
*H04N 5/44*    (2006.01)
(52) U.S. Cl. ..................... 348/559; 348/553; 386/46; 386/52; 386/109
(58) Field of Classification Search .............. 348/559, 348/560, 552, 553, 558; 386/109–112, 46, 386/52; 725/87–103, 131–133
See application file for complete search history.

(56) References Cited

U.S. PATENT DOCUMENTS

| 5,655,214 | A  | * | 8/1997  | Mullett ......................... 725/78 |
| 5,818,520 | A  | * | 10/1998 | Janko et al. .................. 348/192 |
| 6,157,410 | A  | * | 12/2000 | Izumi et al. .................. 348/445 |
| 6,289,163 | B1 | * | 9/2001  | Wang ........................... 386/46 |
| 6,295,094 | B1 | * | 9/2001  | Cuccia ......................... 348/559 |
| 6,614,441 | B1 | * | 9/2003  | Jiang et al. .................. 345/539 |
| 2004/0160532 | A1 |   | 8/2004 | Sun |

FOREIGN PATENT DOCUMENTS

| KR | 20040024340 | 3/2004 |
| WO | 03001788    | 1/2003 |

* cited by examiner

*Primary Examiner*—M. Lee
(74) *Attorney, Agent, or Firm*—Jianq Chyun IP Office

(57) ABSTRACT

A method and an apparatus for capturing consecutive frames in digital video are disclosed. Through adding a function of capturing consecutive frames in digital video to digital televisions or digital recording equipments, the continuous fantastic frames in digital video can be displayed on the screen for users to watch and choose. Besides, with a recording function, those fabulous frames can also be preserved for the use of the follow-up view and demonstration. Finally, the purpose of capturing and storing best frames is achieved.

19 Claims, 2 Drawing Sheets

METHOD AND APPARATUS FOR CAPTURING CONSECUTIVE FRAMES IN DIGITAL VIDEO

CROSS-REFERENCE TO RELATED APPLICATION

Figure 1:
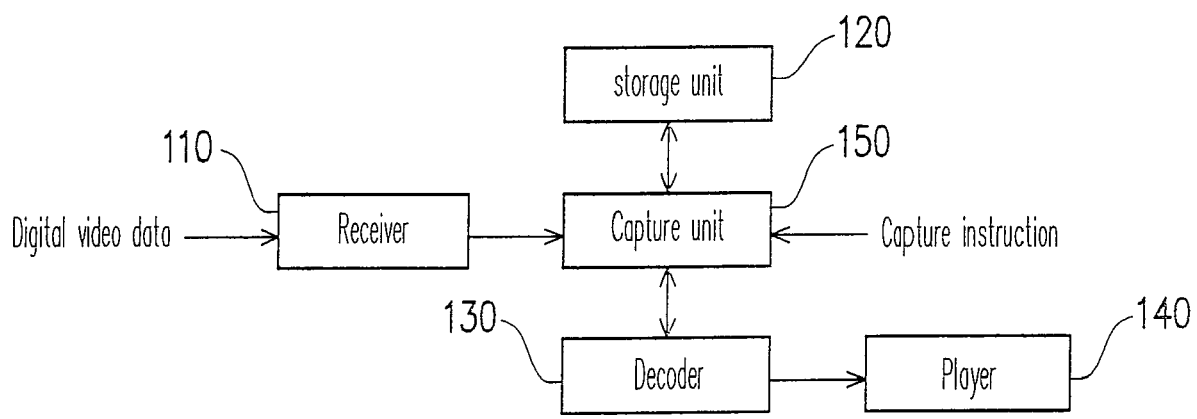

This application claims the priority benefit of Taiwan application serial no. 94129930, filed Aug. 31, 2005. All disclosure of the Taiwan application is incorporated herein by reference.

BACKGROUND OF THE INVENTION

1. Field of the Invention

The present invention relates to a method and an apparatus for capturing video frames, and more particularly, to a method and an apparatus for capturing consecutive frames in digital video.

2. Description of the Related Art

The television broadcast has been digitalized, and the television programs are manufactured and transmitted by digital compression. By using such digitalization technique, it does not only provide video signals with higher quality, but also eliminates the defects of the video distortion or blurs caused by the signal interference in the conventional television. In addition, since all of the programs are transmitted in digital signals, only one storage device is required in the receiving side to record and preserve the digital broadcast data, thus it is very convenient for the users.

In addition to the way for receiving the television broadcast program signals mentioned above, the Digital Video Disc (DVD) also provides an alternative for watching the programs or the DVD titles on the TV. As long as the user bought a DVD player, the user can play the rented DVDs on their TV, which also achieves the same AV entertainment effect provided by the conventional television broadcast programs.

However, while the TV is used to watch the broadcast programs or the DVD titles, it is quite common that the user desires to record the fabulous frames or program clips that are shown on the TV. Nevertheless, since these video programs are made of consecutive video images, even the video frames can be recorded by the still function provided by the conventional recording equipment, only one single video frame can be captured at a time, and because the time point for capturing the video frames is hard to control, usually it is difficult to precisely capture the fabulous frames. In addition, since most of the conventional recording equipments do not support the function of recording video frames, it will be too bad if the interesting video frames cannot be recorded due to the reasons mentioned above.

SUMMARY OF THE INVENTION

Therefore, it is an object of the present invention to provide a method for capturing consecutive frames in digital video. The purpose of capturing the best frames is achieved by capturing consecutive frames in digital video and displaying the captured frames on the screen for users to watch.

It is another object of the present invention to provide an apparatus for capturing consecutive frames in digital video. The purpose of preserving the best frames is achieved by using a capture unit to capture the consecutive frames in the digital video for users to choose, and using a storage unit to store the video frames chosen by the users.

The present invention provides a method for capturing consecutive frames in digital video. First, a record of digital video data is continuously received, wherein the digital video data is composed of a plurality of video frames. Next, the video frames are decoded and a parameter of the digital video data is stored. Then, the decoded video frames are played, wherein a plurality of captured frames are captured from the digital video data according to the parameter of the digital video data after a capture instruction is received. Moreover, the captured frames are decoded and stored. Finally, the captured frames that had been decoded are displayed.

The method for capturing consecutive frames in digital video according to a preferred embodiment of the present invention further selects one of the captured frames as a chosen frame, and performs an edit function on the chosen frame.

In the method for capturing consecutive frames in digital video according to a preferred embodiment of the present invention, the edit function mentioned above comprises storing the chosen frame.

In the method for capturing consecutive frames in digital video according to the preferred embodiment of the present invention, the edit function mentioned above comprises setting the chosen frame as one of a power-on frame, a stand-by frame, and a menu background frame.

In the method for capturing consecutive frames in digital video according to the preferred embodiment of the present invention, the parameter mentioned above comprises one of a frame rate, a movie format, and an encoding method of the video frames in digital video data.

In the method for capturing consecutive frames in digital video according to the preferred embodiment of the present invention, a predetermined time interval is configured between the captured frames mentioned above.

In the method for capturing consecutive frames in digital video according to the preferred embodiment of the present invention, the step of displaying the captured frames that had been decoded displays the captured frames by means of multi-window or single-window.

In the method for capturing consecutive frames in digital video according to the preferred embodiment of the present invention, the digital video data mentioned above comprises one of the digital broadcast program data and the data stored in the optical disk.

An apparatus for capturing consecutive frames in digital video provided by the present invention comprises a receiver, a decoder, a player, a capture unit, and a storage unit. Wherein, the receiver continuously receives a record of digital video data that is composed of a plurality of video frames. The decoder decodes the video frames for obtaining a parameter of the digital video data. The player coupled to the decoder plays the decoded video frames. In addition, after receiving a capture instruction, the capture unit coupled to the receiver, the decoder, and the player mentioned above captures a plurality of captured frames from the digital video data according to the parameter of the digital video data obtained previously. Then, the captured frames are transmitted to the decoder by the capture unit for decoding, and the captured frames that had been decoded are displayed on the screen by the player. Moreover, the storage unit coupled to the capture unit stores the captured frames captured by the capture unit.

In the apparatus for capturing consecutive frames in digital video according to the preferred embodiment of the present invention, the receiver mentioned above comprises a demodulator, a demultiplexer, and a bit stream buffer. Wherein, the demodulator demodulates the received digital video data into a transport stream (TS) data format. The demultiplexer coupled to the decoder recovers the digital video data with such TS data format to the video raw data. In addition, the bit stream buffer coupled to the demultiplexer temporarily stores the video raw data that will be subsequently decoded by the decoder.

In the apparatus for capturing consecutive frames in digital video according to the preferred embodiment of the present invention, the receiver mentioned above further comprises a tuner. The tuner receives a record of digital broadcast data by tuning the frequency, and transmits the received digital broadcast data to the demodulator.

In the apparatus for capturing consecutive frames in digital video according to the preferred embodiment of the present invention, the player mentioned above comprises a frame buffer and a display screen. Wherein, the frame buffer temporarily stores the video frames, and the video frames stored in the frame buffer are displayed on the display screen.

In the apparatus for capturing consecutive frames in digital video according to the preferred embodiment of the present invention, the capture unit mentioned above further comprises following functions: selecting one of the captured frames as a chosen frame, and performing an edit function on the chosen frame.

Since a mechanism capable of capturing consecutive frames in digital video is applied in the present invention, the consecutive fabulous frames in digital video can be displayed on the screen for users to watch and choose. Besides, with a recording function, those fabulous frames can also be preserved, and the purpose of capturing and storing best frames is achieved.

BRIEF DESCRIPTION DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 1 schematically shows a flow chart illustrating a method for capturing consecutive frames in digital video according to a preferred embodiment of the present invention.

Figure 2:
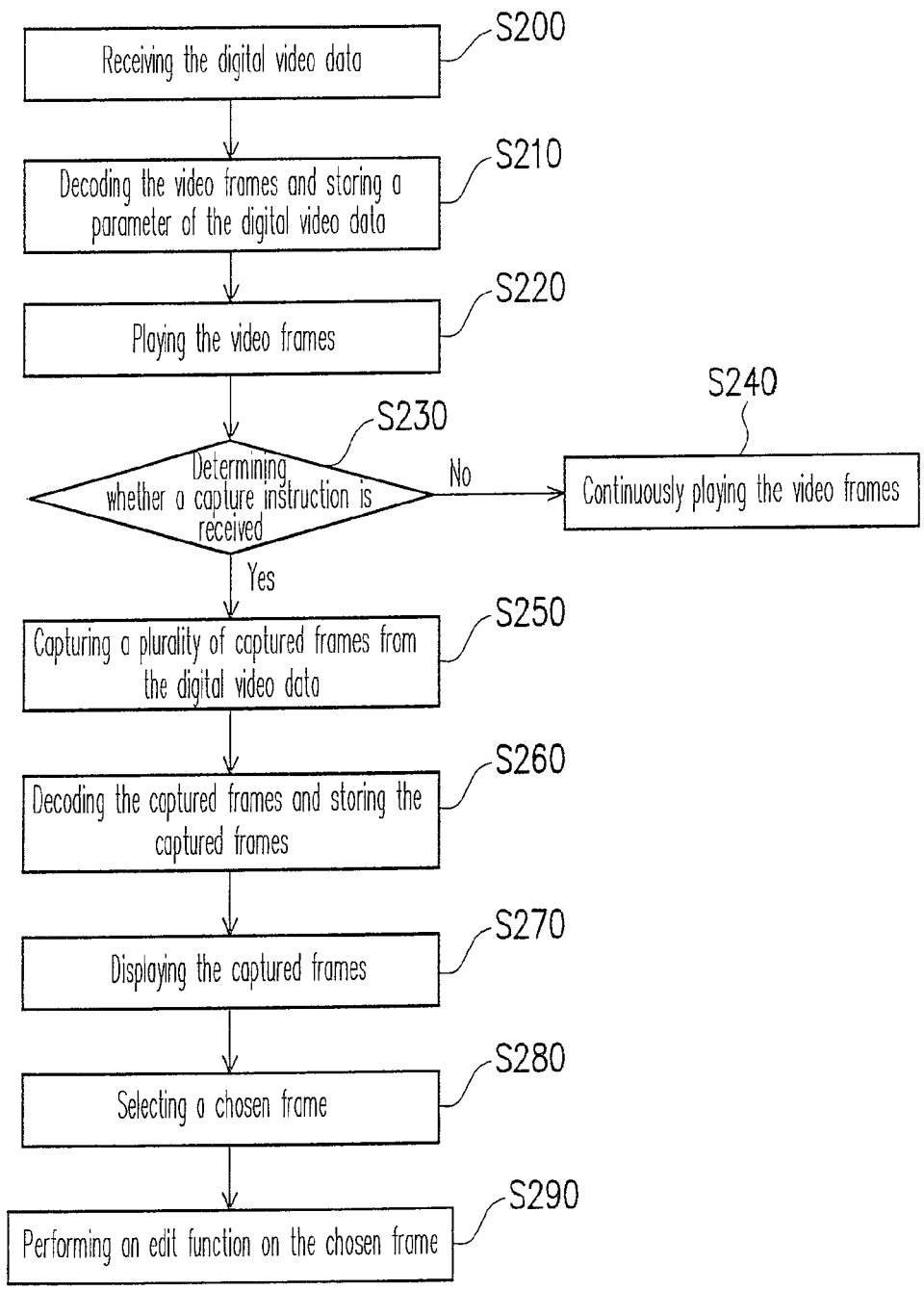

FIG. 2 schematically shows a block diagram of an apparatus for capturing consecutive frames in digital video according to a preferred embodiment of the present invention.

Figure 3:
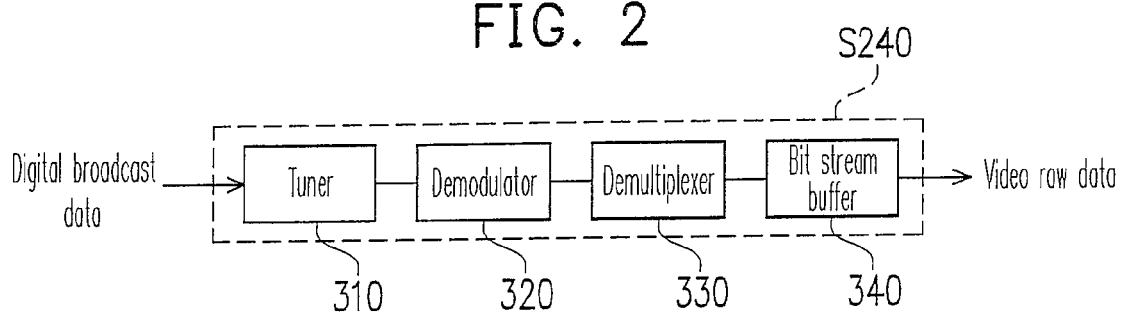

FIG. 3 schematically shows a detail block diagram of a receiver in the apparatus for capturing consecutive frames in digital video according to the preferred embodiment of the present invention.

DESCRIPTION PREFERRED EMBODIMENTS

FIG. 1 schematically shows a flow chart illustrating a method for capturing consecutive frames in digital video according to a preferred embodiment of the present invention. Referring to FIG. 1, in the present embodiment, the consecutive frames are captured from the digital video and displayed on the screen by means of single-window or multi-window for users to watch or choose, such that a convenient way is provided for the users to capture the fabulous frames.

First, a record of digital video data is continuously received (step S200), wherein the digital video data is composed of a plurality of video frames. In addition, the digital video data may be the digital broadcast program data or the digital AV data recorded in other storage device such as DVD or VCD optical disk.

Then, the digital video data is decompressed and decoded into a series of still frames according to the encoding format of the digital video data by an appropriate decoding apparatus, and meanwhile a parameter of the digital video data is stored (step S210). Wherein, the parameter of the digital video data mentioned above may be the frame rate, the movie format, or the encoding method of the video frames in the digital video data, but the present invention has no intention to limit its type and quantity.

Then, the decoded video frames begin to play on the screen (S220). Wherein, since the video frames are displayed continuously and quickly and in response to the effect of the human eye's vision still characteristic, the user treats the displayed video frames as consecutive frames. Meanwhile, if the displaying of video frames is paused by the user, a single still video frame is shown on the screen.

The plurality of captured frames is obtained by applying the principle described above in the following steps. First, while displaying the video frames, it starts to detect and determine whether a capture instruction is received (step S230). If the capture instruction is not received yet, the video frames are continuously displayed (step S240). Otherwise, once the capture instruction is received, the frame data corresponding to each specific time point will be searched from the digital video data according to the parameter of the digital video data previously recorded and the predetermined time interval, so as to obtain a plurality of captured frames (step S250). Wherein, the time interval may be predetermined by the user as capturing one frame every one second, every ½ second, or every ¼ second. Moreover, the search range has no limitation and may be configured by the users in consideration of the physical requirements and their preference.

Similarly, the captured frames are decoded by an appropriate decoding apparatus and temporarily stored therein for further access by the user (step S260). Finally, the captured frames that had been decoded are displayed on the screen (step S270). Wherein, the captured frames may be displayed by means of continuously playing in a single-window or sequentially playing in a multi-window, such that the captured frames can be presented to the user. Specifically, the single-window is a way of displaying each different frame with a predetermined interval, and the multi-window is a way of dividing a frame into nine blocks, and displaying the frame with a different time point on each of the blocks.

Meanwhile, the user can select a most desired chosen frame from the captured frames displayed on the screen (step S280), and performs an edit function on the chosen frame (step S290). Wherein, the edit function comprises storing the chosen frame into a memory in the TV or the recording equipment, setting the chosen frame as one of a power-on frame, a stand-by frame, or a menu background frame of the TV or the recording equipment, but not necessarily limited by it.

FIG. 2 schematically shows a block diagram of an apparatus for capturing consecutive frames in digital video according to a preferred embodiment of the present invention. Referring to FIG. 2, an apparatus for capturing consecutive frames in digital video is configured in the AV apparatus such as the TV or the recording equipment in the present embodiment, such that the fabulous frames in the dynamic video can be captured and preserved after the selection for the use of the follow-up view and demonstration.

The apparatus for capturing consecutive frames in digital video of the present embodiment comprises a receiver 110, a storage unit 120, a decoder 130, a player 140, and a capture unit 150. Wherein, the receiver 110 continuously receives a record of digital video data that is composed of a plurality of video frames. The digital video data may be the digital broadcast program data or the digital video data stored in other storage device such as the optical disk.

Then, the video frames received by the receiver 110 are transmitted to the decoder 130 through the capture unit 150, and decoded by the decoder 130 with an appropriate decoding method according to the encoding format of the digital video data. Moreover, a parameter of the digital video data is obtained while decoding the video frames. Wherein, the parameter may be one of the frame rate, the movie format, and the encoding method of the video frames in the digital video data.

Afterwards, the decoded video frames are displayed by the player 140 for users to watch. The steps mentioned above are a general flow of displaying a general digital TV broadcast program. Moreover, the function of capturing consecutive frames in digital video provided by the apparatus of the present invention is described in greater detail hereinafter.

When the user sees an interesting broadcast program or an DVD title on the TV, the user can press a control button on a remote controller or on the TV, such that a capture instruction is sent to the capture unit 150. Meanwhile, the capture unit 150 captures a plurality of captured frames from the digital video data according to the parameter of the digital video data previously obtained and the time interval predetermined by the user. Then, the captured frames are transmitted to the decoder 130 for decoding, and the decoded frames are subsequently transmitted to the player 140 for displaying. Wherein, the captured frames are displayed on the screen for users to watch by means of continuously playing in a single-window or sequentially playing in a multi-window.

In addition, the capture unit 150 also transmits and stores the captured frames in the storage unit 120 for further choices. Wherein, the player 140 may further comprise a frame buffer for temporarily storing the decoded video frames, so as to provide a buffer for video frame data access between the decoder 130 and the display screen.

Certainly, as described in the previous embodiment, the capture unit 150 may further perform an edit function on a chosen frame selected by the user on the player 140. Wherein, the edit function comprises storing the chosen frame into a memory in the TV or the recording equipment, setting the chosen frame as one of a power-on frame, a stand-by frame, or a menu background frame of the TV or the recording equipment, but not necessarily limited by it.

Moreover, in an embodiment of the present invention, the receiver 110 mentioned above may comprise a tuner, a demodulator, a demultiplexer, and a bit stream buffer. The interconnections of the components mentioned above are schematically shown in a detail block diagram of the receiver 110 in FIG. 3.

As shown in FIG. 3, first the tuner 310 receives a record of digital broadcast data from the external by tuning a frequency, and then transmits the received digital broadcast data to the demodulator 320. Meanwhile, the demodulator 320 demodulates the received digital video data into the digital video data with a transport stream (TS) format, and then transmits the demodulated digital video data to the demultiplexer 330. Afterwards, the demultiplexer 330 recovers the digital video data with the transport stream (TS) format to the video raw data. Wherein, the video raw data is the data file provided to the decoder (not shown) for decoding. In addition, a bit stream buffer 340 is further configured in the present embodiment, and the bit stream buffer 340 disposed between the demultiplexer 340 and the decoder (not shown) works as a buffer for the decoder to access the video raw data.

In summary, in the method and apparatus for capturing consecutive frames in digital video provided by the present invention. Through adding a function of capturing consecutive frames in digital video to digital televisions or digital recording equipments, the continuous fantastic frames in digital video can be displayed on the screen for users to watch and choose. Besides, with a recording function, those fabulous frames can also be preserved for the use of follow-up view and demonstration. Finally, the purpose of capturing and storing best frames is achieved.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method for capturing consecutive frames in digital video, comprising:
   continuously receiving a digital video data, wherein the digital video data comprises a plurality of video frames;
   decoding the video frames and storing a parameter of the digital video data;
   playing the decoded video frames;
   capturing a plurality of captured frames from the digital video data according to the parameter of the digital video data once receiving a capture instruction;
   decoding the captured frames and storing the decoded captured frames; and
   displaying the captured frames that had been decoded.

2. The method for capturing consecutive frames in digital video of claim 1, further comprising:
   selecting one of the captured frames as a chosen frame; and
   performing an edit function on the chosen frame.

3. The method for capturing consecutive frames in digital video of claim 2, wherein the edit function comprises storing the chosen frame.

4. The method for capturing consecutive frames in digital video of claim 2, wherein the edit function comprises setting the chosen frame as one of a power-on frame, a stand-by frame, and a menu background frame.

5. The method for capturing consecutive frames in digital video of claim 1, wherein the parameter comprises one of a frame rate, a movie format, and an encoding method of the video frames in the digital video data.

6. The method for capturing consecutive frames in digital video of claim 1, wherein a predetermined time interval is configured between the captured frames.

7. The method for capturing consecutive frames in digital video of claim 1, wherein the step of displaying the captured frames that had been decoded comprises displaying the captured frames by means of multi-window or single-window.

8. The method for capturing consecutive frames in digital video of claim 1, wherein the digital video data comprises one of a digital broadcast program data and a data stored in an optical disk.

9. An apparatus for capturing consecutive frames in digital video, comprising:
   a receiver for continuously receiving a digital video data, wherein the digital video data comprises a plurality of video frames;
   a decoder for decoding the video frames and obtaining a parameter of the digital video data;
   a player coupled to the decoder for displaying the decoded video frames;
   a capture unit coupled to the receiver, the decoder, and the player for capturing a plurality of captured frames from the digital video data according to the parameter of the digital video data after receiving a capture instruction, and transmitting the captured frames to the decoder for decoding, wherein the decoded captured frames are then transmitted to the player for displaying; and a storage unit coupled to the capture unit for storing the captured frames captured by the capture unit.

10. The apparatus for capturing consecutive frames in digital video of claim 9, wherein the receiver comprises:

a demodulator for demodulating the received digital video data into a transport stream (TS) format;

a demultiplexer coupled to the demodulator for recovering the digital video data with the TS format into a video raw data; and a bit stream buffer coupled to the demultiplexer for temporarily storing the video raw data that will be subsequently decoded by the decoder.

11. The apparatus for capturing consecutive frames in digital video of claim 9, wherein the receiver further comprises:

a tuner for receiving a digital broadcast data by tuning a frequency and transmitting the received digital broadcast data to the demodulator.

12. The apparatus for capturing consecutive frames in digital video of claim 9, wherein the player comprises:

a frame buffer for temporarily storing the video frames; and a display screen for displaying the video frames stored in the frame buffer.

13. The apparatus for capturing consecutive frames in digital video of claim 9, wherein the capture unit further comprises following functions:

selecting one of the captured frames as a chosen frame; and performing an edit function on the chosen frame.

14. The apparatus for capturing consecutive frames in digital video of claim 13, wherein the edit function comprises storing the chosen frame in the storage unit.

15. The apparatus for capturing consecutive frames in digital video of claim 13, wherein the edit function comprises setting the chosen frame as one of a power-on frame, a standby frame, and a menu background frame.

16. The apparatus for capturing consecutive frames in digital video of claim 9, wherein the parameter comprises one of a frame rate, a movie format, and an encoding method of the video frames in the digital video data.

17. The apparatus for capturing consecutive frames in digital video of claim 9, wherein a predetermined time interval is configured between the captured frames.

18. The apparatus for capturing consecutive frames in digital video of claim 9, wherein the method of displaying the captured frames that had been decoded comprises displaying the captured frames by means of multi-window or single-window.

19. The apparatus for capturing consecutive frames in digital video of claim 9, wherein the digital video data comprises one of a digital broadcast program data and a data stored in an optical disk.

* * * * *